(12) United States Patent
Gueron et al.

(10) Patent No.: US 11,184,157 B1
(45) Date of Patent: Nov. 23, 2021

(54) CRYPTOGRAPHIC KEY GENERATION AND DEPLOYMENT

(71) Applicant: Amazon Technologies, Inc., Seattle, WA (US)

(72) Inventors: Shay Gueron, Haifa (IL); Matthew John Campagna, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 295 days.

(21) Appl. No.: 16/007,927

(22) Filed: Jun. 13, 2018

(51) Int. Cl.
| *H04L 29/06* | (2006.01) |
| *H04L 9/08* | (2006.01) |
| *H04L 9/06* | (2006.01) |
| *H04L 9/14* | (2006.01) |
| *H04L 9/32* | (2006.01) |
| *G06F 8/65* | (2018.01) |

(52) U.S. Cl.
CPC ......... *H04L 9/0825* (2013.01); *H04L 9/0643* (2013.01); *H04L 9/083* (2013.01); *H04L 9/088* (2013.01); *H04L 9/0869* (2013.01); *H04L 9/0894* (2013.01); *H04L 9/14* (2013.01); *H04L 9/3247* (2013.01); *G06F 8/65* (2013.01)

(58) Field of Classification Search
CPC ....... H04L 9/0825; H04L 9/30; H04L 9/3245; H04L 9/0866; H04L 9/0643
See application file for complete search history.

(56) References Cited

U.S. PATENT DOCUMENTS

| 2001/0034839 A1* | 10/2001 | Karjoth | ................. | H04L 9/3236 713/190 |
| 2009/0296926 A1* | 12/2009 | Perlman | ................. | H04L 9/0866 380/44 |
| 2012/0047284 A1* | 2/2012 | Tarkoma | ................. | H04L 67/04 709/247 |
| 2016/0080336 A1* | 3/2016 | Ryan | ..................... | H04L 9/0891 713/171 |
| 2016/0241389 A1* | 8/2016 | Le Saint | .................. | H04L 9/14 |

(Continued)

OTHER PUBLICATIONS

Dang, Q., "Recommendation for Applications Using Approved Hash Algorithms," NIST Special Publication 800-107, Revision 1, Aug. 2012, 25 pages.

(Continued)

*Primary Examiner* — Dao Q Ho
(74) *Attorney, Agent, or Firm* — Davis Wright Tremaine LLP

(57) ABSTRACT

Protection against the obsolescence of cryptographic algorithms is provided by generating a cryptographic key pair for future use and storing the public key on a device. The cryptographic key pair supports a signature scheme that is potentially resistant to quantum computing attacks. In an embodiment, a key management server generates a set of one-time use keys sufficient to sign the anticipated number of software updates to be applied to a device. The key management server provides a public key which is stored on the device for later use. In an embodiment, an update to the device us signed with the one-time-use private key, and can be authenticated by the device using the public key. In an embodiment, the key pair supports the use of a one-time signature technique such as a Merkle signature scheme, Winternitz signature, or Lampert signature.

20 Claims, 11 Drawing Sheets

(56) References Cited

U.S. PATENT DOCUMENTS

2017/0244567 A1* 8/2017 Smeets ................ H04L 9/0894
2017/0357496 A1* 12/2017 Smith .................. H04L 9/3228

OTHER PUBLICATIONS

Becker, G., "Merkle Signature Schemes, Merkle Trees and Their Cryptanalyis," Ruhr-Universität Bochum, Jul. 2008, 28 pages.
Buchmann, J., et al., "On the Security of the Winternitz One-Time Signature Scheme," Progress in Cryptology—AFRICACRYPT 2011, Lecture Notes in Computer Science, vol. 6737, 2011, 17 pages.

* cited by examiner

CRYPTOGRAPHIC KEY GENERATION AND DEPLOYMENT

BACKGROUND

Computer security is an important problem. One way that computer systems are secured is through the use of cryptography. In general, cryptography relies on cryptographic keys which are applied to data using a cryptographic algorithm. Some cryptographic algorithms use techniques that rely upon one-way functions or trapdoor functions that are significantly more difficult to invert than they are to compute. Advances in computing technology such as faster processors, cheaper memory, parallel processing, and quantum computing have the potential to render functions that were once considered to be difficult to invert as potentially solvable, thereby weakening the cryptographic algorithms and cryptographic keys that use those functions.

Therefore, providing a secure and effective mechanism for upgrading and improving the cryptographic algorithms used by computing devices is an important problem.

BRIEF DESCRIPTION OF THE DRAWINGS

Various techniques will be described with reference to the drawings, in which.

DETAILED DESCRIPTION

Figure 1:
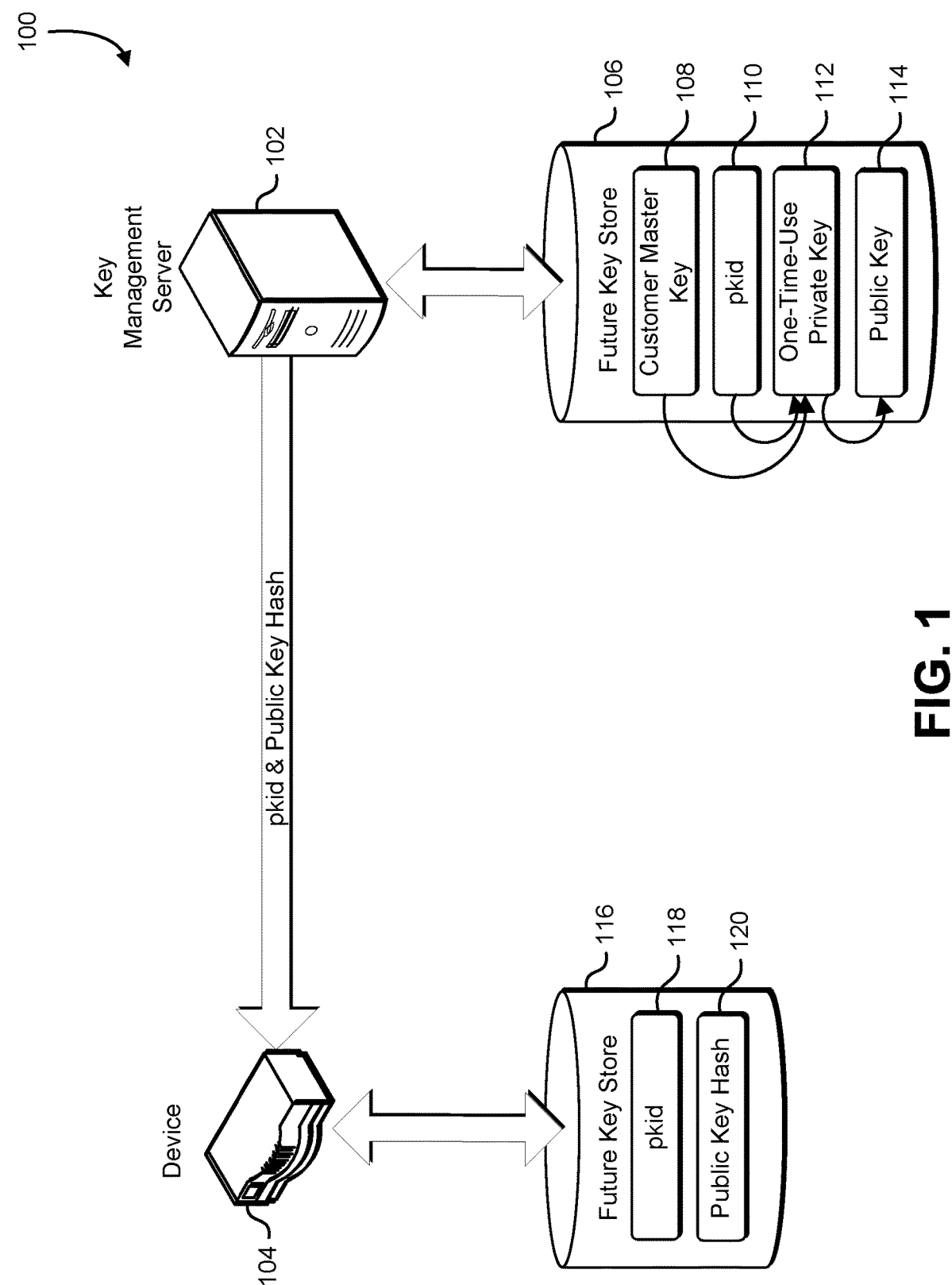
FIG. 1 shows an illustrative example of a system that deploys a future cryptographic key for use in securing a device, in an embodiment.

The present document describes a system and method that provides protection against the obsolescence of cryptographic algorithms by providing a cryptographic key pair for future use that is resistant to malicious activity enabled by quantum computing. The cryptographic key pair is held in reserve for later use in the event that existing cryptographic techniques are rendered insufficiently secure. For example, businesses that manufacture devices that need to be deployed for a long time (possibly beyond the time frame where quantum computing achieves greater usage), may desire a quantum-safe signature scheme to secure future software updates. In many situations, the number of updates for a device is limited, and often the number of updates is no more than a few thousand. Current cryptographic schemes based on asymmetric signatures such as Rivest-Shamir-Adleman ("RSA") or Elliptic Curve Digital Signature Algorithm ("ECDSA") are known not to be quantum resistant. Therefore, in an embodiment, a quantum-safe key is embedded into the device for future use, should standards or advances in technology prompt a change to the cryptographic algorithms used to secure the device.

In an embodiment, the proposed solution uses one-time signature techniques such as Merkle signature schemes ("MSS"), Winternitz signatures, or Lampert signatures. In an embodiment, the system generates a set of one-time-use keys sufficient to sign the anticipated number of software updates to be applied to a device. In an embodiment, the system generates a single one-time-use key which is updated as each new software update is applied to the device.

In an embodiment, the system relies on a key management server to perform low-latency atomic key-management operations using a web-based API. In an embodiment, the system describes an enhanced key management server with a number of new functionalities. In an embodiment, the key management server invokes a key derivation function that operates within a secure environment of the key management server, and uses a customer master key ("CMK") and a randomly generated key identifier to generate a key pair for a one-time hash-based signature scheme. In an embodiment, upon generating the key pair, the system returns the public key and the key identifier. In an embodiment, the key management server adds the ability to produce a digital signature for message using the generated key pair. In an embodiment, generation of the digital signature is controlled using access control policies of the key management server. In an embodiment, the key management server may be implemented as a computer system, computer server, or virtual computer system that hosts a key management service.

In an embodiment, this allows the key management server to generate a public key that can be used to generate a desired number of one-time-use signatures on behalf of a customer. In an embodiment, the public key is the top node of a tree-hash, such as a Merkle tree. In an embodiment, the key management system generates a public key for each device in a set of devices, and a different public key is distributed to each device. In an embodiment, the key management system generates a single public key that is distributed to a plurality of devices. In an embodiment, key information such as the public key, the key identifier, or a cryptographic hash of the public key may be stored on a device and saved for future use in the event that current cryptographic keys and algorithms become compromised due to advances in technology.

As one skilled in the art will appreciate in light of this disclosure, certain embodiments may be capable of achieving certain advantages, including some or all of the following: (1) the system allows the deployment of advanced quantum-safe cryptographic keys today, reducing the customer's concerns about deploying long-term upgradable systems that require quantum-safe signature solutions in the future. In many examples, this enables a customer to use today's signature scheme and have a quantum-safe public key for a future transition to a hash-based signature scheme already in place. (2) The key management server can implement the signing algorithms at a future date and do it in a modular and atomic way. In an embodiment, one or more hardware security modules ("HSMs") are used to perform operations on the private key, and the more time consuming tree construction is performed outside of an HSM.

FIG. 1 shows an illustrative example of a system 100 that deploys a future cryptographic key for use in securing a device, in an embodiment. In an embodiment, a system includes a key management server 102 and a device 104. In an embodiment, the key management server 102 is a computer server, server cluster, virtual computer system, or service hosted on a container runtime or serverless execution environment. In an embodiment, the key management server 102 is connected to a network interface and provides cryptographic key management servers such as key generation, key rotation, signature generation, data encryption, and decryption. In an embodiment, access to the key management server 102 is determined based on a set of customer accounts where each customer account is associated with a set of cryptographic keys managed by the server.

In an embodiment, the key management server 102 maintains a future key store 106 for each customer of the server. In an embodiment, the future key store 106 is a memory, disk drive, or other writable computer-readable media accessible to the key management server 102. In an embodiment, the future key store 106 retains a customer master key 108, a key identifier ("ID") 110 ("pkid"). In an embodiment, the customer master key 108 is a symmetric cryptographic key associated with a particular customer. In an embodiment, the key ID 110 is a randomly generated identifier that is used to identify and generate a one-time-use private key for future use. In an embodiment, the one-time-use private key 112 is a cryptographic key generated using a combination of the key ID 110 and the customer master key 108 as inputs to a key derivation function ("KDF"). In an embodiment, the public key 114 is generated from and associated with the one-time-use private key 112. In an embodiment, the one-time-use private key 112 and the public key 114 are a quantum-safe private-public key pair such as a Lamport key pair, Winternitz key pair, or Merkle Signature key pair. A cryptographic technique is considered to be quantum-safe if advances in technology that enable practical quantum computing are not anticipated to reduce the cryptographic strength of the technique.

In an embodiment, the key management server 102 receives a request to generate a set of one-time-use cryptographic keys for the device 104. In an embodiment, the key management server 102 looks up the customer master key 108 and generates the key ID 110 (a random identifier). Using a key derivation function, the key management server 102 generates the one-time-use private key 112, in an embodiment. In an embodiment, the key management server 102 generates the public key 114 from the one-time-use private key 112. In an embodiment, the key management server 102 retains this information in the future key store 106, and sends the key ID and the public key 114 to the device 104. In an embodiment, the key management server 102 sends a cryptographic hash of the public key 114 to the device 104. In an embodiment, upon receipt of the key ID 110 and public key 114 (or public key hash), the device 104 stores the information in a future key store 116. In an embodiment, the future key store 116 is a memory, disk drive, or other storage device accessible to the device 104.

In an embodiment, the device 104 is a customer device such as a network router, network switch, cell phone, computer system, laptop, tablet device, or network-connected appliance. In an embodiment, the future key store 116 holds a copy of the key ID 118 and a cryptographic hash of the public key 120 (public key hash). In an embodiment, the future key store 116 includes the public key itself.

In an embodiment, if the customer wishes to send a signed update to the device 104 that can be validated in a quantum-safe way, the customer generates the update and submits the update to the key management server 102 for signing. The update may be submitted by authenticating the customer using credentials provided with the update, and confirming that the security policies of the key management server allow the customer to create a signed update. In an embodiment, the customer submits the update to the key management server over a network via a web interface. In an embodiment, the key management server 102 receives the update and generates a signature using the one-time-use private key 112. In an embodiment, the signed update is provided to the device 104 (by the key management server 102 or by any other communication channel). In an embodiment, upon receiving the update, the device 104 acquires the public key by either retrieving the public key from the future key store 116, or receiving the public key with the update, and confirming the public key against the stored public key hash 120. In an embodiment, the signature on the update is confirmed using the public key, and if the signature is valid, the update is applied to the device 104.

Figure 2:
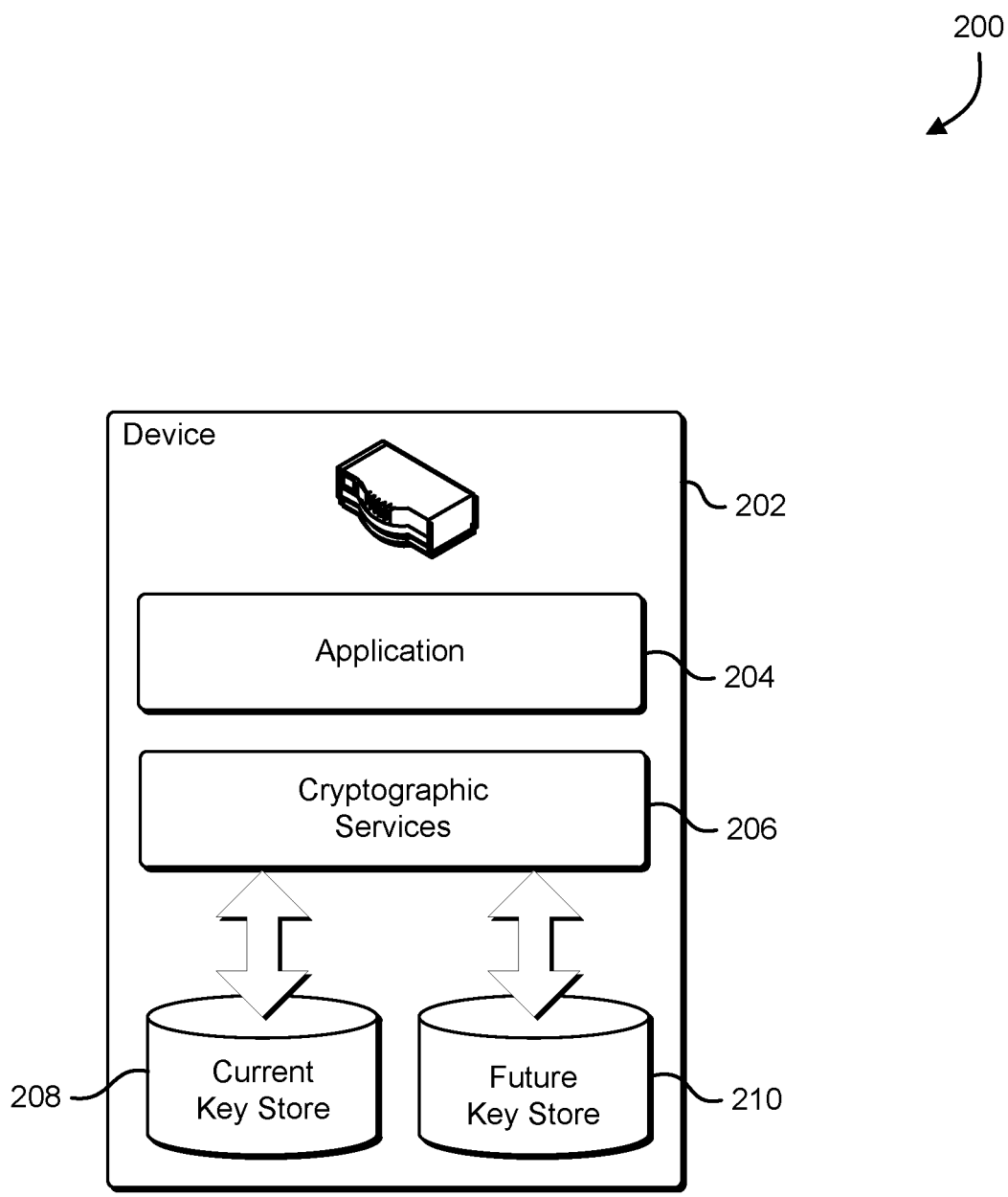
FIG. 2 shows an illustrative example of a device that includes a future cryptographic key for authenticating device updates, in an embodiment.

FIG. 2 shows an illustrative example of a device 200 that includes a future cryptographic key for authenticating device updates, in an embodiment. In an embodiment, a device 202 is a computing device such as a network-connected appliance, the client computer system, server computer system, a cell phone, tablet computer system, a network-connected data acquisition device, or an embedded microcontroller capable of receiving and applying software updates. In an embodiment, the device 202 includes one or more processors and a memory for holding computer-executable instructions that, as a result of being executed by the one or more processors cause the device to perform operations. The executable instructions include instructions associated with an application 204 and a set of cryptographic services 206. In an embodiment, the application 204 is written to the device 202 by the manufacturer. In an embodiment, the set of cryptographic services 206 is a set of instructions that implement cryptographic encryption, decryption signing, or signature verification operations. In an embodiment, the application 204 is capable of updating itself in response to the receipt of an update message provided by an outside entity such as the device manufacturer. In an embodiment, the set of cryptographic services 206 may also be updated.

In an embodiment, the cryptographic services 206 use a set of cryptographic keys maintained in a current key store 208. In an embodiment, the current key store 208 may include symmetric and/or asymmetric cryptographic keys that are used to encrypt, decrypt, sign, and verify messages sent and received by the device 202. In an embodiment, application updates received by the device 202 are signed with a cryptographic key maintained in the current key store 208, and the set of cryptographic services 206 verifies the digital signature as a condition of applying the update to the application 204. In an embodiment, updates to the set of cryptographic services 206 are signed with a cryptographic key in the future key store 210. In an embodiment, the future key store 210 stores a one-time-use cryptographic public key usable to verify an update to the set of cryptographic services 206. In an embodiment, when an update to the set of cryptographic services 206 is received by the device 202, the device 202 verifies the signature on the update using the one-time-use cryptographic key and then applies the update to the set of cryptographic services 206. In an embodiment, after applying the update, the device 202 erases the one-time-use cryptographic key from the future key store 210 (or otherwise renders the one-time-use cryptographic key unusable). In an embodiment, after applying the update to the set of cryptographic services 206, the device 202 requests a new one-time-use public cryptographic key, which is stored in the future key store 210.

Figure 3:
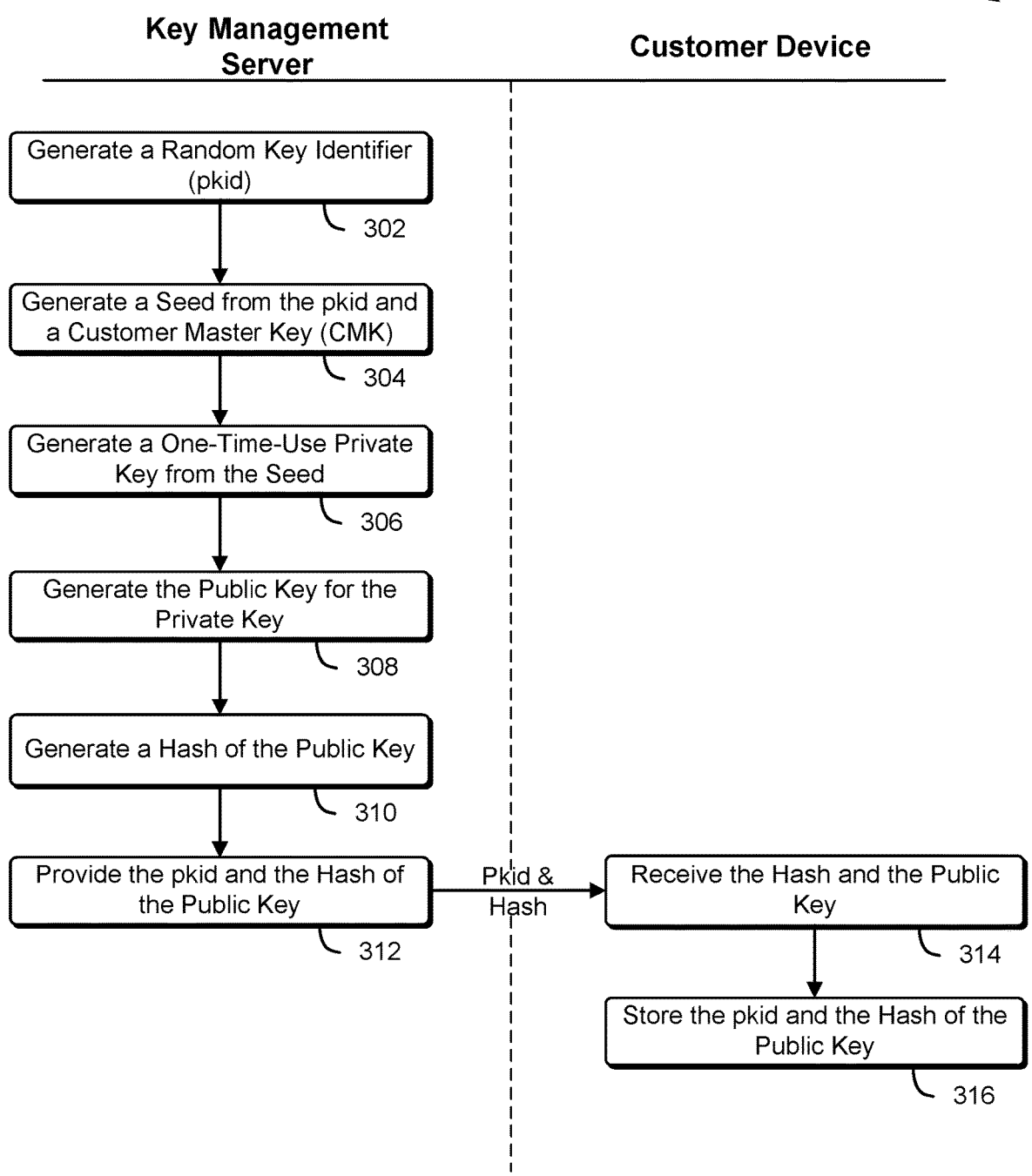
FIG. 3 shows an illustrative example of a process that, as a result of being performed by a key server and a customer device, installs a future cryptographic key on the device, in an embodiment.

FIG. 3 shows an illustrative example of a process 300 that, as a result of being performed by a key server and a customer device, installs a future cryptographic key on the device, in an embodiment. In an embodiment, the customer device is a device manufactured, owned, or controlled by a customer of the key management server. In an embodiment, the process begins at block 302 with a key management server generating a random key identifier or pkid. In an embodiment, at block 304, the key management server retrieves a customer master key for the customer that controls the device. In an embodiment, the key management server calls a key derivation function using the customer master key and the random key identifier to produce a seed value.

In an embodiment, at block 306, the key management server generates a one-time-use private key from the seed value. In an embodiment, the one-time-use private key is a Merkle signature key, Winternitz Key, or Lamport key. In an embodiment, the seed values are used to generate a plurality of one-time-use private keys. In an embodiment, at block 308, a public key is generated for the private key or keys. In an embodiment, the public key is generated by generating a cryptographic hash of the private key. In an embodiment, the public key is generated from a plurality of private keys by building a hash tree such as a Merkle tree, where the root of the tree is used as a public key. In an embodiment, at block 310, a hash of the public key is generated, and at block 312, the cryptographic hash of the public key and the random key identifier are transmitted to the customer device.

In an embodiment, at block 314, the customer device receives the random key identifier and a cryptographic hash of the public key. In an embodiment, the public key itself is set rather than the hash. In an embodiment at block 316, the customer device saves the random key identifier and the cryptographic hash of the public key (or public-key) in a memory on the customer device. In an embodiment, the public key may be used at a later time to verify the signature on a software update or other message in a quantum-safe computing environment.

Figure 4:
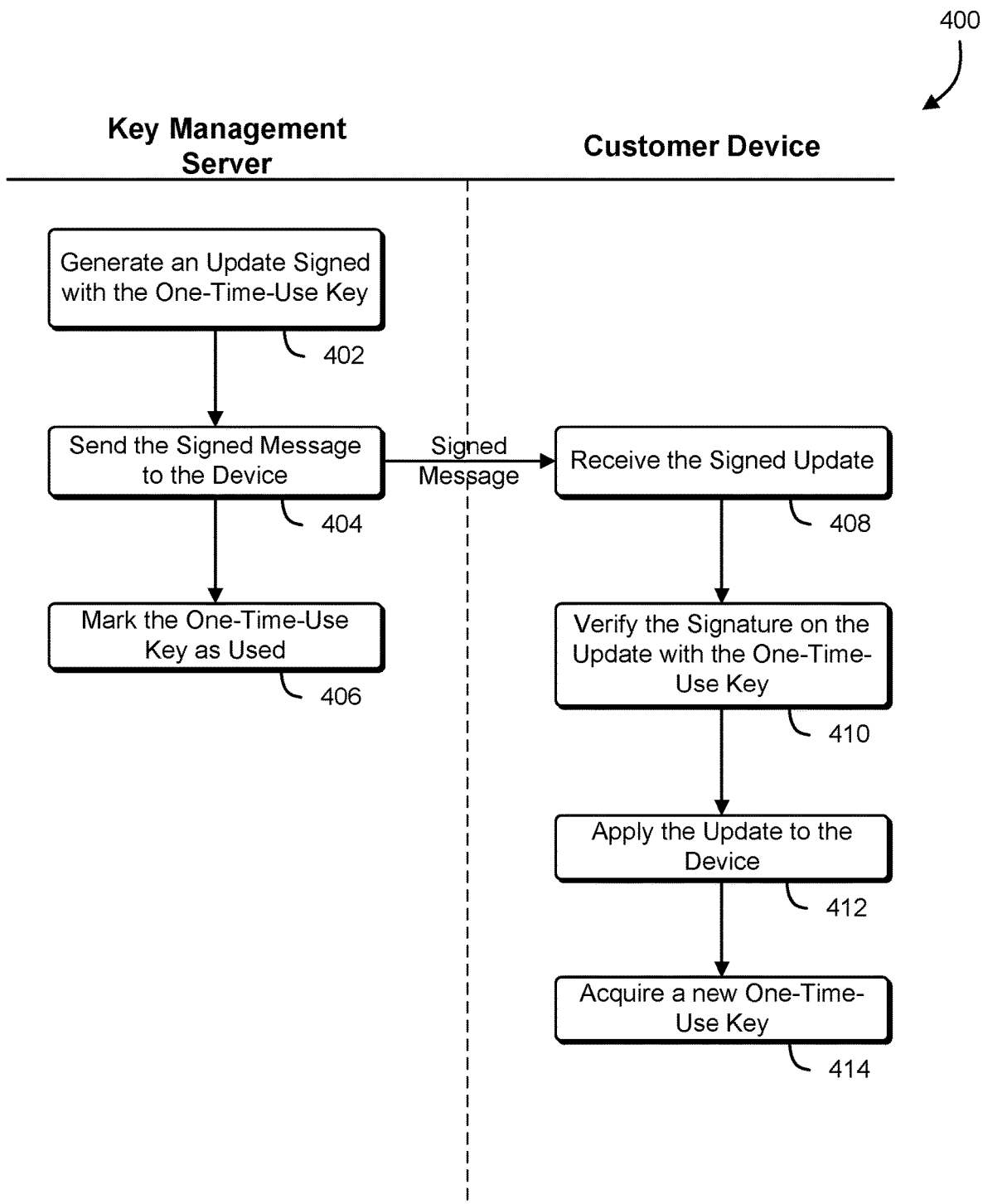
FIG. 4 shows an illustrative example of a process that, as a result of being performed by a key server and a customer device, verifies and installs a device update signed with a future cryptographic key on the device, in an embodiment.

FIG. 4 shows an illustrative example of a process 400 that, as a result of being performed by a key server and a customer device, verifies and installs a device update signed with a future cryptographic key on the device, in an embodiment. In an embodiment, the process begins at block 402 with the key management server generating an update for a customer device, such as a cryptography update, or an application update. In an embodiment, the key management server generates a digital signature for the update using a one-time-use key previously generated and stored on the device as described and shown in FIG. 3. In an embodiment, the digital signature may be generated as described below in FIG. 5. In an embodiment, at block 404, the key management server sends the signed update to the customer device. In an embodiment, after sending the signed message, the key management server marks 406 the one-time-use key used to sign the update as no longer usable. In an embodiment, the one-time-use key is deleted.

In an embodiment, at block 408, the device receives the signed update from the key management server. In an embodiment, at block 410, the device verifies the signature on the update with the public key previously provided by the key management server as described above in FIG. 3. In an embodiment, signature information such as portions of a Merkle tree are provided with the update to allow the device to verify the signature. In an embodiment, if the signature is valid, execution proceeds to block 412 and the update is applied to the device. In an embodiment, the update is applied by overwriting executable instructions on the device with block data provided in the update. In an embodiment, the update is an update that affects the cryptographic protections and services on the device. In an embodiment, at block 414, the device acquires a new public key. In an embodiment, the new public key may be provided by the key management server using the procedure described in FIG. 3. In an embodiment, at block 414, the public key stored on the device is the root node of a Merkle tree, thereby allowing the public key to be used for multiple update signatures in accordance with the dimensions of the tree. In such embodiments, the device maintains a record of used keys and will not validate an update with the same key more than once.

Figure 5:
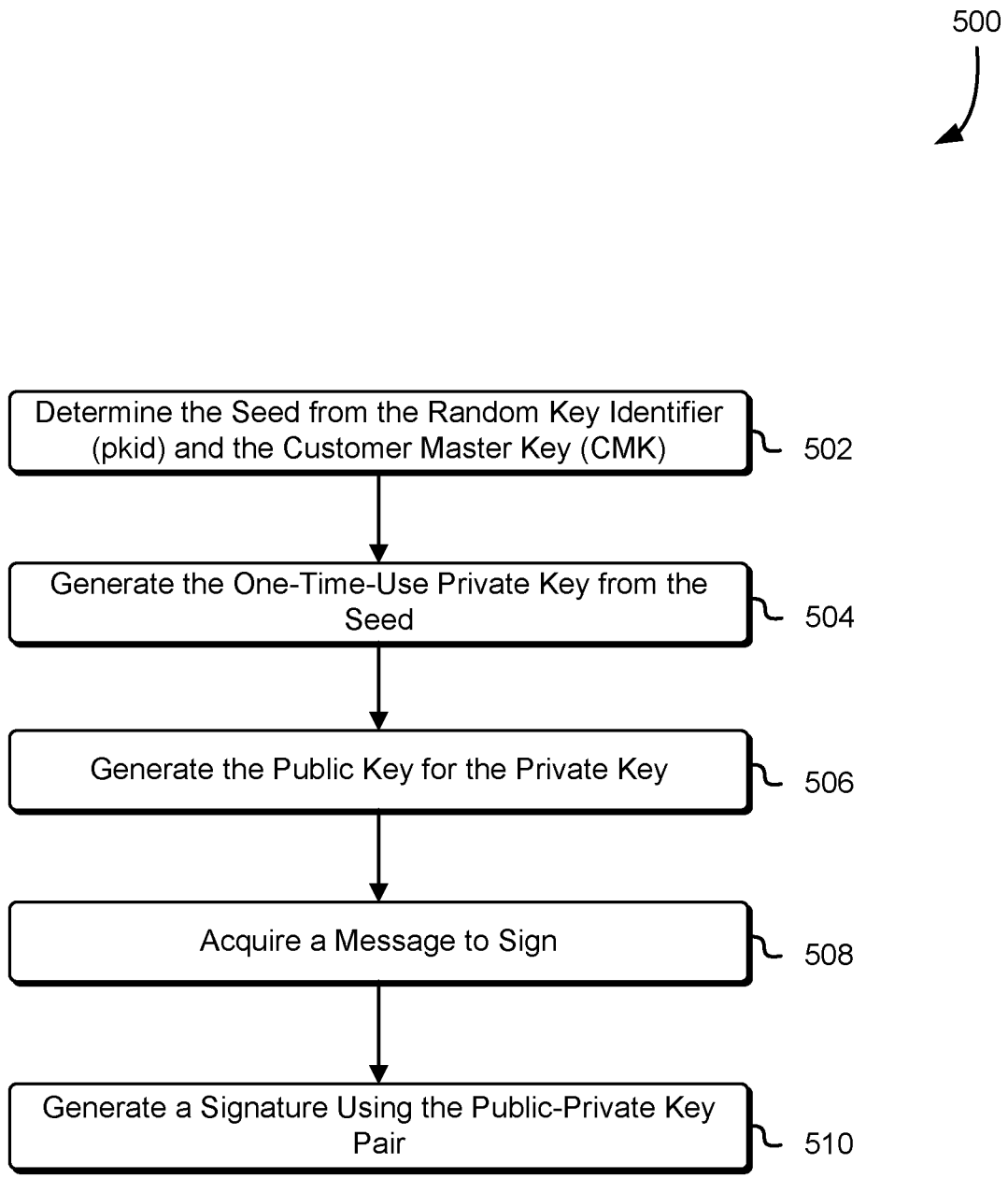
FIG. 5 shows an illustrative example of a process that, as a result of being performed by a computer system, generates a digital signature from a key identifier and a master key, in an embodiment.

FIG. 5 shows an illustrative example of a process 500 that, as a result of being performed by a computer system, generates a digital signature from a key identifier and a master key, in an embodiment. In an embodiment, the process begins at block 502 with a computer system generating a seed value using a random key identifier and a cryptographic key. In an embodiment, the cryptographic key is a symmetric cryptographic key associated with a customer, and the random key identifier is associated with a device. In an embodiment the seed value is generated using a key derivation function where the random key identifier and the cryptographic key are inputs to the key derivation function. In an embodiment, at block 504, the computer system generates a one-time-use private key from the seed. In an embodiment, the one-time-use private key may be generated as a Lamport signature key, a Merkle signature key, or a Winternitz signature key. In an embodiment, at block 506, the computer system generates a public key for the private key in accordance with the signature scheme used. In an embodiment, at block 508, the computer system acquires a message to sign. In an embodiment, the message may be a software update, a system log, a permissions update, or sensitive information. In an embodiment, at block 510, the computer system generates the signature using the one-time-use private key. In general, one-time-use keys are not reused to sign more than one unique message because doing so compromises the cryptographic integrity of the key. However, the present disclosure does not preclude such use if the reader deems the resulting lowered level of security is acceptable.

Figure 6:
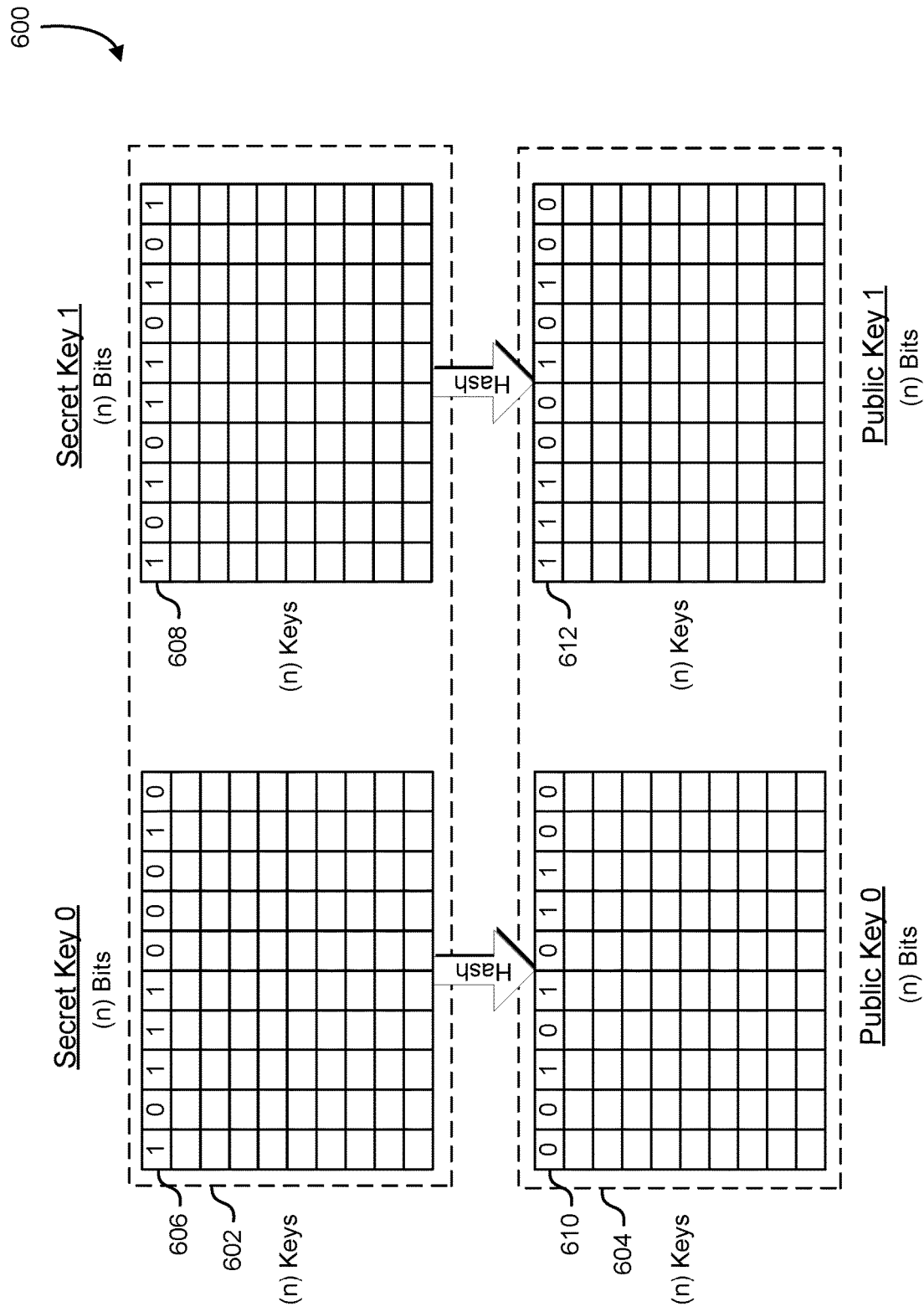
FIG. 6 shows an illustrative example of a one-time-use cryptographic key that includes secret key pairs and corresponding public key pairs, in an embodiment.

FIG. 6 shows an illustrative example of a one-time-use cryptographic key that includes secret key pairs and corresponding public key pairs. A diagram 600 shows a one-time-use key that is generated by a key management server. In an embodiment, the one-time-use key is comprised of a secret key pair 602 and a public key pair 604. In an embodiment, the secret key pair 602 includes a first secret key 606 and a second secret key 608. In an embodiment, the first secret key 606 and the second secret key 608 each consist of a number (n) of n-bit keys. In some embodiments, the first secret key 606 and the second secret key 608 are random numbers generated by the key management server. In other embodiments, the key management server generates the first secret key 606 and the second secret key 608 from a secret seed value using a key derivation function ("KDF"). In an embodiment, the secret seed value is itself generated from a symmetric or asymmetric cryptographic key and a random key identifier.

In an embodiment, the public key pair 604 includes a first public key 610 and a second public key 612. In an embodiment, the first public key 610 and the second public key 612 each include a number (n) of n-bit hashes that correspond to the keys of the first secret key 606 and the second secret key 608. In an embodiment, each n-bit key of the secret key pair 602 is used to generate a corresponding n-bit hash of the public key pair 604. In an embodiment, the hash of the first key of the first secret key 606 is the first hash of the first public key 610. In an embodiment, each hash is generated with a cryptographic hash function or one-way function $h(x)=y$ where y is easy to calculate for a given x, but x is computationally difficult to calculate for a given y. In an embodiment, SHA256, SHA384, SHA512, or SHA3, hash functions are used to generate the hashes. In an embodiment, the public key pair 604 is published by a key management server.

Figure 7:
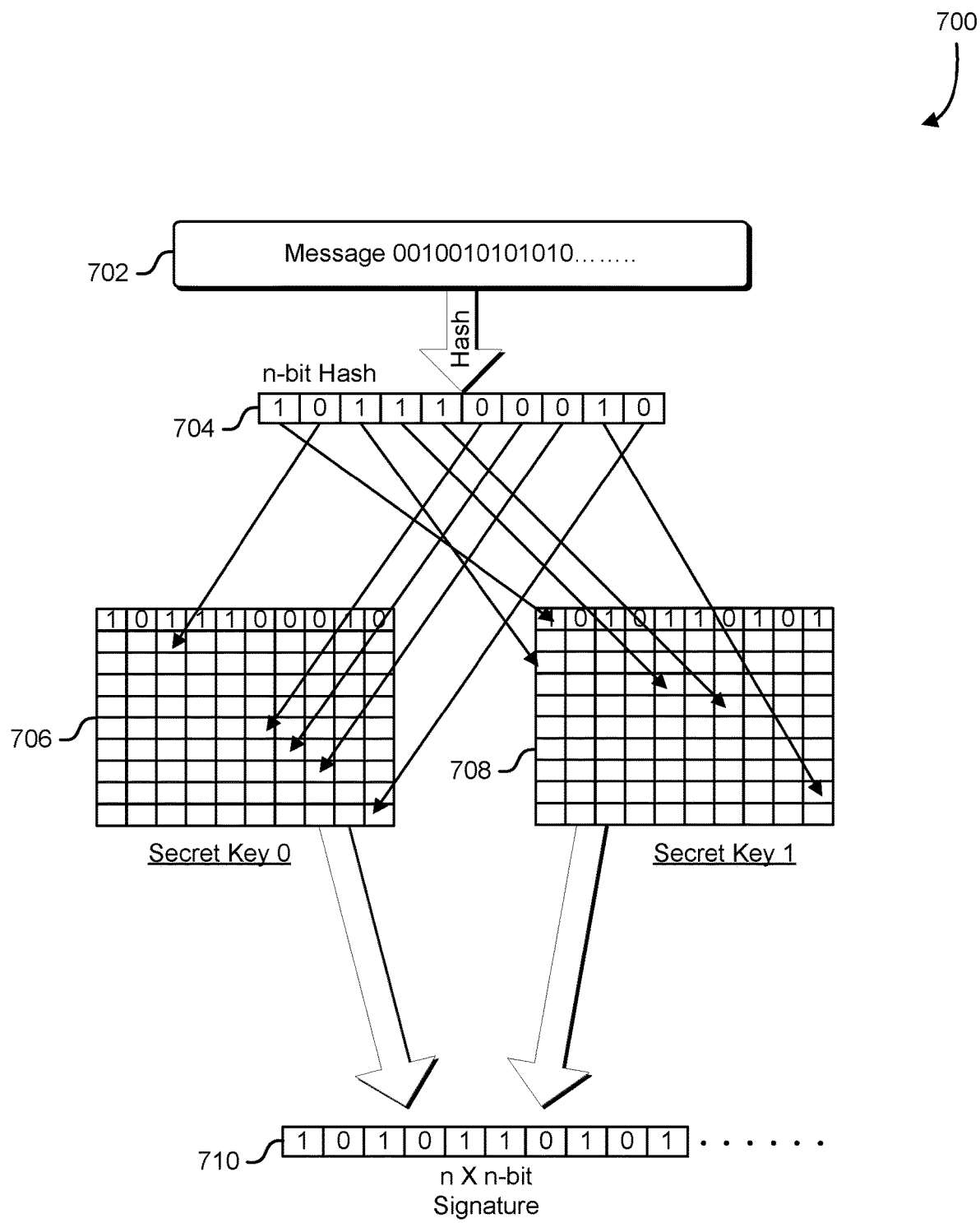
FIG. 7 shows an illustrative example of signing a message with a one-time-use cryptographic key, in an embodiment.

FIG. 7 shows an illustrative example of signing a message with a one-time-use cryptographic key. In an embodiment, a diagram 700 illustrates the signing of a message 702 by a key management server using a one-time-use key. In an embodiment, the message 702 may be a network packet, digital certificate, transactional record, media file, legal document, software update, cryptography update, or other message submitted for signing by a requester. In an embodiment, the key management server receives the message 702 from the requester and determines an n-bit message hash 704 using a cryptographic hash function or other one-way function. In an embodiment, a one-way function or cryptographic hash has the property that, for a given input, a hash value is relatively easy to calculate but, for a given hash value, an input that produces the given hash value is comparatively difficult. In an embodiment, cryptographic hash functions such as SHA256, SHA384, SHA512, SHA3 may be used as the cryptographic hash function.

In an embodiment, to sign the message 702, the key management server selects a one-time-use key for use in generating the digital signature. In an embodiment, if the key management server has exhausted the supply of one-time-use keys, the key management server reports an error and does not sign the message 702. In an embodiment, if the key management server has used the supply of one-time-use keys, a key may be selected for reuse. In an embodiment, a particular cryptographic key may be selected for reuse based at least in part on the number of times the particular key has been reused and the particular secret keys used to generate previous signatures. In an embodiment, the key management server maintains a key-use database that records the number of times each key has been used and the digital signature generated with each key. In an embodiment, to locate a key for reuse, the key management server may locate those keys that have been used the least number of times to generate digital signatures. In an embodiment, the key management server is provided with the message to be signed, and the key management server identifies a cryptographic key for reuse that, when generating a digital signature for the message, reveals the lowest number of additional secret key portions of the available reusable cryptographic keys.

In an embodiment, the one-time-use key includes a secret key pair that includes a first secret key 706 and a second secret key 708. In an embodiment, for each bit (m) of the n-bit message hash 704, the key management server selects either the m'th key from the first secret key if the bit is a zero bit, or the m'th key from the second secret key if the bit is a one bit. In an embodiment, the selected keys are concatenated to form a digital signature 710 having n-squared bits. In an embodiment, the digital signature 710 is provided to the requester. In an embodiment, in addition to the digital signature 710, the requester is provided with public key information associated with the selected one-time-use key to support the verification of the digital signature 710. In an embodiment, the public key information may include one or more hashes of a hash tree or Merkle tree that link the public key information to a public key of the key management server. In an embodiment, for each bit of the n-bit message hash 704, a secret key is chosen from either the first secret key 706 or the second secret key. In an embodiment, for 'zero' bits of the n-bit message hash 704, a secret key corresponding to the bit in the n-bit message hash is selected from the first secret key 706. In an embodiment, for 'one' bits of the n-bit message hash 704, a secret key corresponding to the bit in the n-bit message hash is selected from the second secret key 708. In an embodiment, the bit position within the n-bit message hash 704 corresponds to the row (key number) within either the first secret key 706 or second secret key 708. In an embodiment, in the example shown in FIG. 7, for each bit of the n-bit message hash, an arrow indicates the row of the particular secret key (having n-bits) which is added to the resulting digital signature 710.

Figure 8:
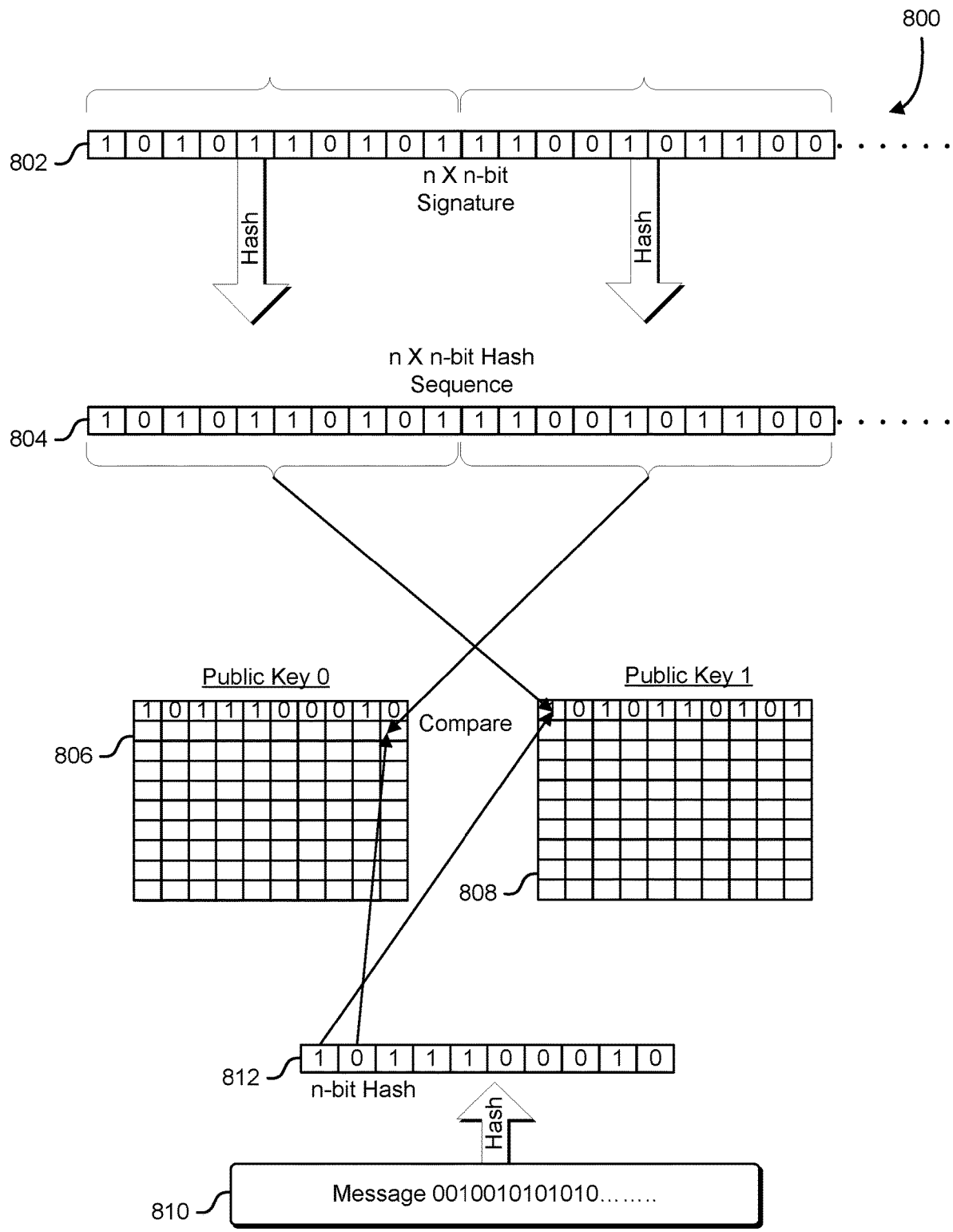
FIG. 8 shows an illustrative example of verifying a signed message with a one-time-use cryptographic key, in an embodiment.

FIG. 8 shows an illustrative example of verifying a message with a one-time-use cryptographic key. In an embodiment, a diagram 800 illustrates how a recipient of a signed message, such as a customer device, is able to verify a digital signature. In an embodiment, to verify the signed message, the recipient separates a digital signature 802 from the signed message. In an embodiment, the digital signature 802 has n-squared bits, and the recipient divides the digital signature 802 into n-key portions of n-bits each. In an embodiment, the recipient determines a hash of each key portion and assembles the hashes into a hash sequence 804 of n, n-bit hashes.

In an embodiment, using information provided with the digital signature, the recipient identifies the particular one-time-use-key used to generate the digital signature and requests related public key information from a key management server. In an embodiment, the key management server provides the recipient with a public key pair corresponding to the one-time-use key used to generate the digital signature. In an embodiment, the public key pair includes a first set of public keys 806 and a second set of public keys 808.

In an embodiment, the recipient extracts a message body 810 from the signed message and uses a cryptographic hash function to determine an n-bit message hash 812 for the message body 810. In an embodiment, for each bit (m) of the n-bit message hash 812, the recipient determines whether the bit is a one or zero. In an embodiment, if the bit is a zero, the recipient compares the m'th key of the first set of public keys 806 to the m'th hash of the hash sequence 804. In an embodiment, if the bit is a one, the recipient compares the m'th key of the second set of public keys 808 to the m'th hash of the hash sequence 804. In an embodiment, if any of the comparisons do not match, the signature is not valid for the provided message. In an embodiment, if the comparisons match, the signature is valid. In an embodiment, additional verifications are performed to confirm that the public keys provided are in compliance with a Merkle tree or hash tree maintained by a key management server. In an embodiment, for each bit of the n-bit message hash 812, a public key is chosen from either the first set of public keys 806 or the second set of public keys 808. In an embodiment, for 'zero' bits of the n-bit message hash 812, a public key corresponding to the bit in the n-bit message hash is selected from the first set of public keys 806. In an embodiment, for 'one' bits of the n-bit message hash 812, a public key corresponding to the bit in the n-bit message hash 812 is selected from the second set of public keys 808. In an embodiment, the bit position within the n-bit message hash 812 corresponds to the row (key number) within either the first set of public keys 806 or second set of public keys 808. In an embodiment, in the example shown in FIG. 8, for each bit of the n-bit message hash, an arrow indicates the row of the particular public key (having n-bits) that is compared to the hash sequence 804.

Figure 9:
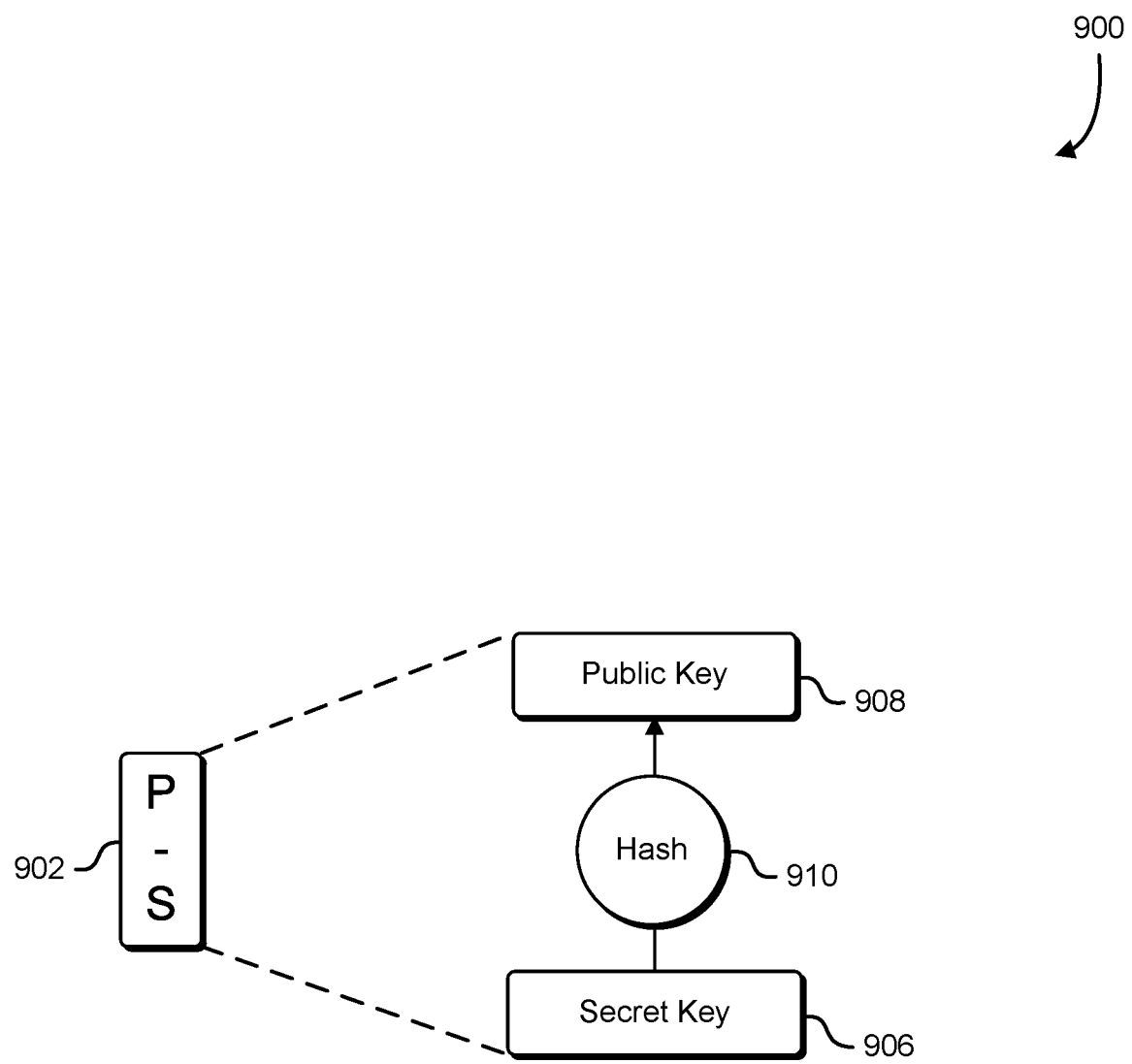
FIG. 9 shows an illustrative example of a secret key with an associated public key, in an embodiment.

FIG. 9 shows an illustrative example of a secret key with an associated public key. A diagram 900 shows a one-time-use cryptographic key 902. In an embodiment, the one-time-use cryptographic key 902 comprises a secret key portion 906 and a public key portion 908 that is derived from the secret key portion 906 using a hash function 910 such as a cryptographic hash or one-way function. In an embodiment, the one-time-use cryptographic key 902 may be a key used in a Lamport signature scheme, a Winternitz signature scheme, or other one-time-use signature scheme using public and secret key pairs. In an embodiment, in some implementations, the one-time-use cryptographic key 902 is arranged in a hash tree, Merkle tree, or other structure where the public key portion 908 is hashed with other public key portions of other one-time-use cryptographic keys into a single public key of a signature entity. In an embodiment, in the following figures, the combination of the public key portion 908 and the secret key portion 906 may be represented as a public key/secret key pair.

Figure 10:
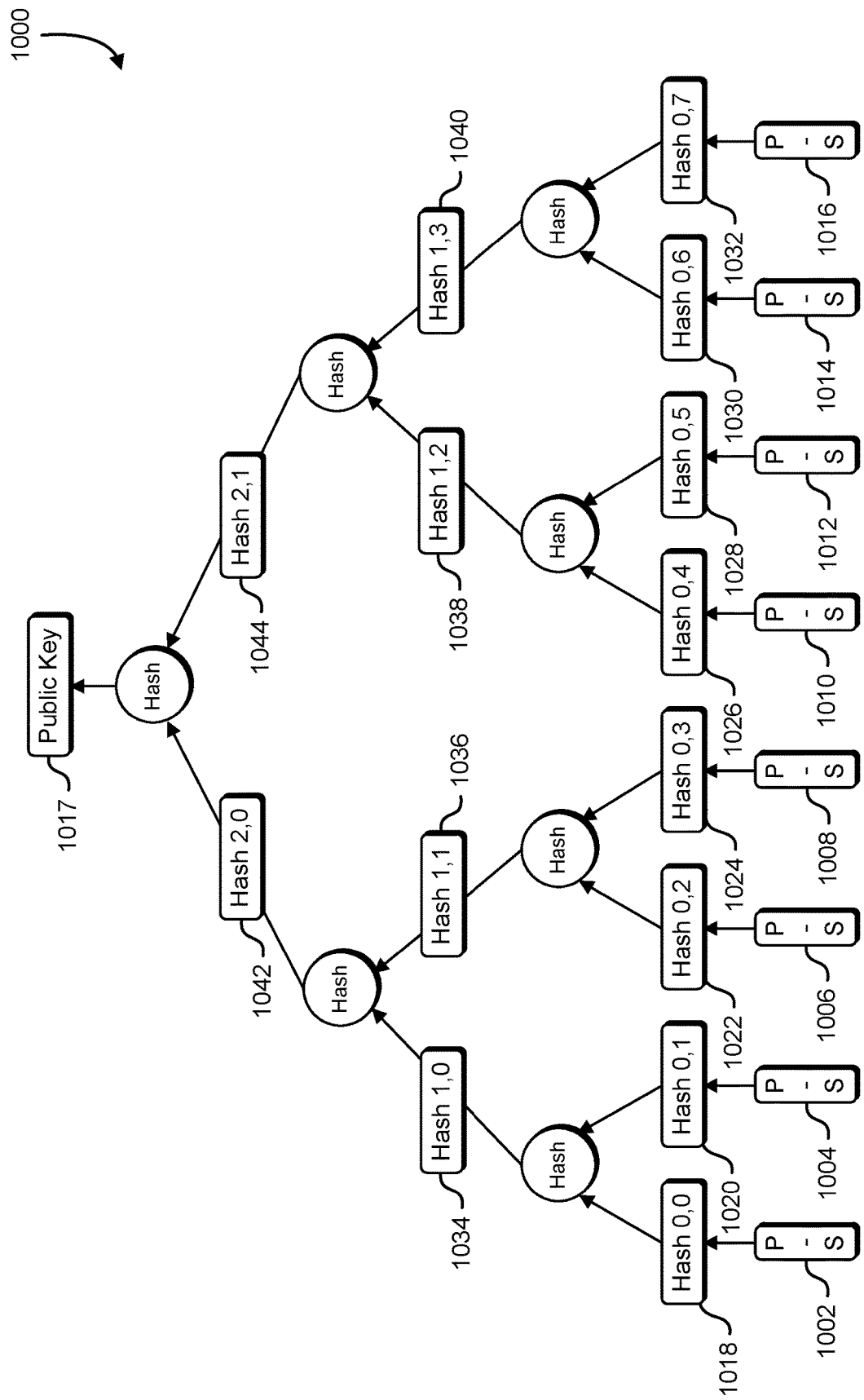
FIG. 10 shows an illustrative example of a Merkle tree of one-time-use cryptographic keys, in an embodiment.

FIG. 10 shows an illustrative example of a Merkle tree of one-time-use cryptographic keys. In an embodiment, a diagram 1000 shows a binary Merkle tree that links a collection of one-time-use cryptographic keys 1002, 1004, 1006, 1008, 1010, 1012, 1014, and 1016 to a public key 1017 associated with a customer device. In an embodiment, each one-time-use cryptographic key is comprised of a secret key and a public key derived from the secret key using a cryptographic hash. In an embodiment, the secret key consists of n-pairs of n-bit secret keys, and the public key consists of n-pairs of n-bit hashes that correspond to the n-bit secret keys. In an embodiment, the public keys are published by the key management server, and the secret keys are maintained by the key management server for use in generating digital signatures. In an embodiment, a collection of corresponding level-0 hash nodes 1018, 1020, 1022, 1024, 1026, 1028, 1030, and 1032 is generated from the public keys of the one-time-use cryptographic keys. In an embodiment, each level-0 hash node is generated by taking a cryptographic hash of a public key of an associated one-time-use cryptographic key.

In an embodiment, the level-0 hash nodes are incorporated into the Merkle tree. In an embodiment, pairs of level-0 hash nodes are combined using a cryptographic hash function to generate a set of four level-1 hash nodes 1034, 1036, 1038, and 1040. In the example shown in FIG. 10, hash 0,0 and hash 0,1 are concatenated and hashed to generate hash 1,0. Hash 0,2 and hash 0,3 are concatenated and hashed to generate hash 1,1. Hash 0,4 and hash 0,5 are concatenated and hashed to generate hash 1,2. Hash 0,6 and hash 0,7 are concatenated and hashed to generate hash 1,3. The four level-1 hash nodes are combined to generate two level-2 hash nodes 1042, and 1044. In the example shown in FIG. 10, hash 1,0 and hash 1,1 are concatenated and hashed to generate hash 2,0, and hash 1,2 and hash 1,3 are concatenated and hashed to generate hash 2,1. The level-2 hash nodes 1042 and 1044 are combined and hashed to produce the public key 1017. In an embodiment, the public key 1017 is published by the key management server so that recipients of a digital signature are able to confirm that the signature was generated with a one-time-use cryptographic key that is linked to the Merkle tree.

In an embodiment, a recipient of a digital signature validates the signature using the public key information associated with the one-time-use cryptographic key used to generate the digital signature. In an embodiment, the public key information is validated against the public key 1017 that is associated with a customer device. In an embodiment, the key management server provides the recipient of the digital signature with the hash value nodes of the Merkle tree that are necessary to re-create the public key 1017 from the public key information.

For example, if the one-time-use cryptographic key 1006 is used to generate the digital signature, the public key information associated with the one-time-use cryptographic key 1006 is used to confirm that the digital signature was created from the secret key associated with the one-time-use cryptographic key 1006. The level-0 hash node 1022 can be re-created by the recipient using the public key information associated with the one-time-use cryptographic key 1006. In addition to the public key 1017, the key management server provides the level-0 hash node 1024, the level-1 hash node 1034, and the level-2 hash node 1044. The recipient uses the determined level-0 hash node 1022 and the provided level-0 hash node 1024 to generate the level-1 hash node 1036. The recipient uses the generated level-1 hash node 1036 and the provided level-1 hash node 1034 to generate the level-2 hash node 1042. The generated level-2 hash node 1042 and the provided level-2 hash node 1044 are used to generate the public key 1017. In an embodiment, if the generated public key matches the published public key provided by the key management server, the one-time-use cryptographic key 1006 is a valid member of the Merkle tree. In an embodiment, if the generated public key does not match the published public key, the one-time-use cryptographic key 1006 is not a valid member of the Merkle tree.

In an embodiment, a key management server generates a Merkle tree having a plurality of leaf nodes. In an embodiment, each leaf node has an associated public key and private key. In an embodiment, the key pair associated with each leaf node is a one-time-use cryptographic key suitable for use in generating a Merkle signature. In an embodiment, the key management server distributes information to individual devices that allows each device to use one of the key pairs of the Merkle tree. In an embodiment, the information is the public key of a particular leaf node. In an embodiment, information is the public key of a particular leaf node and the public key of the root of the Merkle tree. In an embodiment, the information is a hash of the root node of the Merkle tree and either the public key of a particular leaf node or a hash of the public key of a particular leaf node. In an embodiment, an individual device is able to verify that a message is signed by the key management server and that the message is signed with a particular key assigned to the device.

Figure 11:
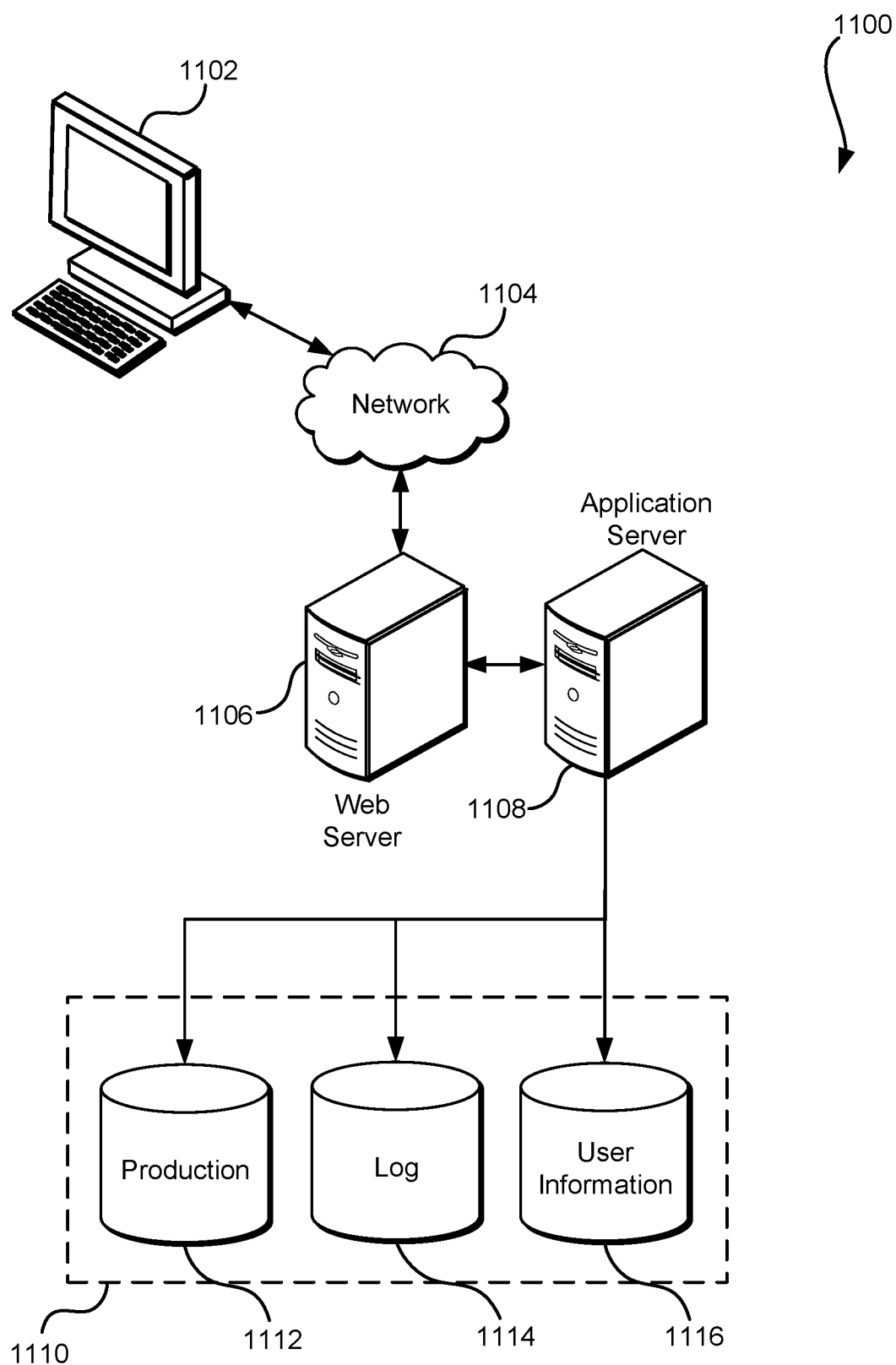
FIG. 11 illustrates a system in which various embodiments can be implemented.

FIG. 11 illustrates aspects of an example system 1100 for implementing aspects in accordance with an embodiment. As will be appreciated, although a web-based system is used for purposes of explanation, different systems may be used, as appropriate, to implement various embodiments. In an embodiment, the system includes an electronic client device 1102, which includes any appropriate device operable to send and/or receive requests, messages, or information over an appropriate network 1104 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1106 for receiving requests and serving content in response thereto, although for other networks an alternative device serving a similar purpose could be used as would be apparent to one of ordinary skill in the art.

In an embodiment, the illustrative system includes at least one application server 1108 and a data store 1110 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1102 and the application server 1108, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1112 and user information 1116, which are used to serve content for the production side. The data store also is shown to include a mechanism for storing log data 1114, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1110.

The data store 1110, in an embodiment, is operable, through logic associated therewith, to receive instructions from the application server 1108 and obtain, update or otherwise process data in response thereto and the application server 1108 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 1102. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), AES128, and AES192 and the international data encryption algorithm (IDEA). Symmetric key algorithms may also include those used to generate output of one way functions and include algorithms that utilize hash-based message authentication codes (HMACs), message authentication codes (MACs) in general. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of finding another input x2, different from x1, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. A value can be cryptographically derived using a one-way function. An encryption function can be (or can be a component of) a one-way function from the perspective of an entity that lacks information (e.g., cryptographic key and/or salt) used as input into the encryption function. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. The phrase cryptographically derived means using a one way function at least once using inputs that are the values or derived from the values (possibly cryptographically derived from the values). For example, an encryption operation is one-way to entities that do not have the decryption key.

In various embodiments, data objects such as software updates, digital certificates, and digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

A Merkle tree may be a tree-based data structure where each non-leaf node of the Merkle tree is generated by a cryptographic hash function having inputs that include at least each child node of a particular non-leaf node. In some embodiments, additional information, such as a nonce may be used as inputs in addition to the child nodes as inputs to a cryptographic hash function used to generate the value of a non-leaf node. In some embodiments, the leaf nodes of a Merkle tree may be generated using any one-time signature key pairs including key pairs in accordance with a Lamport-Diffie One-Time Signature (LD-OTS) scheme or a Winternitz One-Time Signature (W-OTS) scheme. In some embodiments, a computer system may generate the leaf nodes of a Merkle tree by generating n secret key values. The secret key values, ski, may be random or pseudo-random numbers that are generated, for example, by a pseudo random number generator (PRNG) using a random seed. For a binary Merkle tree, the number of leaf nodes of a Merkle tree may be a power of two, but it is not required that the number of leaf nodes be a power of two. A system may use a cryptographic hash function to generate the public keys pk_i. A secret value sk_i may be an input to a cryptographic hash function and the corresponding public key pk_i may be the output. A cryptographic hash function or pseudo-random function may be used to generate the public key. The pair {sk_i, pk_i} may be referred to as a signing key pair. The leaf nodes of the Merkle tree may be the public keys. [FIG. 10 shows an example of a binary Merkle tree.]

While the example Merkle tree shown in [FIG. 10] is an exemplary binary Merkle tree, any k-ary tree (i.e., a tree structure wherein each node has at most k child nodes) may be used in place of or in combination with other tree structures. For example, in some embodiments, a ternary tree (i.e., a tree structure wherein each node has at most three child nodes) may be used in place of or in addition to a binary tree.

A cryptographic function may generally refer to a function that deterministically maps a domain of inputs (e.g., a pre-image) to a range of outputs (e.g., an image) in a manner that appears truly random. Thus, given the output of a cryptographic hash function, it should be no more likely that any value in the domain of inputs was more likely to have generated the output than another value in the domain. Additionally, because a cryptographic hash function deterministically maps a domain of inputs to a range of outputs, the same input will generate the same output.

An authentication path may refer to a collection of nodes (i.e., hash values of the nodes) that may be used to verify that a first node and a second node are connected nodes of a Merkle tree. For example, an authentication path may be formed from a public signing key pkj to the root node PK. An authentication path may be verified by hashing the public signing key pkj with the first node of the authentication path, and iteratively hashing the hash outputs with the next node of the authentication path. The authentication path is verified if the final output after iteratively hashing the public key pkj with all nodes of the authentication path is equal to the public key. The same principle described here may be applied to build an authentication path between any non-leaf node and a descendent node. In some embodiments, additional information may be obtained that may be used to determine how the authentication path should be verified. For example, the additional information may include information regarding the position of the public signing key pkj, information regarding the position of the respective nodes included in the authentication path, or both. The additional information may be used, for example, to determine the order in which values should be concatenated to verify the authentication path. For example, the information may be used to determine whether a verification process should generate a hash H(pkj, H_0) or H(H_), pkj) as part of verifying the authentication path where is the first node of the collected nodes of an authentication path. The additional information may, for example, include the position of the public signing key pkj in the Merkle tree.

In the present document, hashes may refer to cryptographic hashes. A cryptographic hash is a function that is collision resistant, pre-image resistant, second-reimage resistant, and produces a seemingly uniform random digest across a digest space. In an embodiment, a cryptographic hash function may be used as a trapdoor or one-way function.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implements an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   randomly generating a key identifier;
   determining a seed value based at least in part on a combination of the key identifier and a symmetric master key;
   generating a one-time-use private key based at least in part on the seed value, the one-time-use private key identified by the key identifier;

generating a public key for the one-time-use private key by at least constructing a tree, where a root node of the tree comprises the public key and nodes of the tree are generated at least in part on the public key and a secret key;
determining a hash of the public key; and
providing the key identifier and the hash of the public key to a device.

2. The computer-implemented method of claim 1, further comprising:
generating a signature for a message using the one-time-use private key; and
providing the signature and the message to the device to enable the device to determine that the message is authentic.

3. The computer-implemented method of claim 2, wherein:
the message is a software update for the device; and
causing the device to apply the software update.

4. The computer-implemented method of claim 1, wherein the tree is a Merkle tree.

5. A system, comprising:
one or more processors; and
memory that stores computer-executable instructions that, if executed, cause the one or more processors to:
obtain a key identifier;
obtain a seed value based at least in part on the key identifier and a symmetric key;
generate a one-time-use private key, to be identified by the key identifier, based at least in part on the seed value;
generate a public key for the one-time-use private key by at least generating a tree including a first node generated based at least in part on the public key and a second node generated based at least in part on the public key and a secret key; and
provide the key identifier and a hash of the public key.

6. The system of claim 5, wherein the tree is a Merkle tree; and
wherein the computer-executable instructions, as a result of being executed by the one or more processors, further cause the system to:
generate a plurality of one-time-use keys of which the one-time-use private key is a member based at least in part on the key identifier and the symmetric key;
generate the Merkle tree for the plurality of one-time-use keys; and
provide a public key associated with a leaf node of a set of leaf nodes of the Merkle tree.

7. The system of claim 5, wherein the computer-executable instructions, as a result of being executed by the one or more processors, further cause the system to store the key identifier in association with an identity of a device to which the public key is provided.

8. The system of claim 5, wherein the computer-executable instructions, as a result of being executed by the one or more processors, further cause the system to:
obtain the key identifier by at least generating a random identifier;
generate the seed value based at least in part on the key identifier and the symmetric key; and
generate the one-time-use private key by at least providing the seed value to a key derivation function.

9. The system of claim 5, wherein the computer-executable instructions, as a result of being executed by the one or more processors, further cause the system to:
generate a digital signature for a message using the one-time-use private key; and
provide the digital signature and the message.

10. The system of claim 9, wherein the digital signature is a Lamport signature, a Winternitz signature, or a Merkle tree signature.

11. The system of claim 10, wherein:
the message and the digital signature are provided to a device; and
the message includes information that causes the device to apply a device update.

12. The system of claim 5, wherein the computer-executable instructions, as a result of being executed by the one or more processors, further cause the system to:
generate a digital signature based at least in part on the one-time-use private key; and
provide the digital signature to a device to enable the device to authenticate a message.

13. A non-transitory computer-readable storage medium storing thereon executable instructions that, as a result of being executed by one or more processors of a computer system, cause the computer system to at least:
obtain a key identifier to identify a one-time-use private key;
obtain a seed value based at least in part on the key identifier and a symmetric key;
generate the one-time-use private key, to be identified by the key identifier, based at least in part on the seed value;
generate a public key for the one-time-use private key by at least generating a tree including a first node generated based at least in part on the public key and a second node generated based at least in part on the public key and a secret key; and
provide the key identifier and a hash of the public key.

14. The non-transitory computer-readable storage medium of claim 13, wherein the executable instructions further comprise instructions that, as a result of being executed by the one or more processors, cause the computer system to:
acquire an update for a device;
generate a digital signature for the update using the one-time-use private key; and
provide the digital signature and the update to the device.

15. The non-transitory computer-readable storage medium of claim 14, wherein:
the one-time-use private key is comprised of two sets of random values, each set including n elements of n bits; and
the public key is comprised of two sets of hash values corresponding to the two sets of random values, and a first hash value in a first set of hash values is a hash of a corresponding random value in the two sets of random values.

16. The non-transitory computer-readable storage medium of claim 13, wherein the executable instructions that cause the computer system to obtain the key identifier further include instructions that cause the computer system to generate the key identifier as a random value.

17. The non-transitory computer-readable storage medium of claim 13, wherein the executable instructions further comprise instructions that, as a result of being executed by the one or more processors, cause the computer system to:
generate a plurality of one-time-use keys based at least in part on the key identifier and the symmetric key;

generate the tree by at least generating a Merkle tree for the plurality of one-time-use keys; and wherein the public key is based at least in part on a root of the Merkle tree.

18. The non-transitory computer-readable storage medium of claim 13, wherein the executable instructions further comprise instructions that, as a result of being executed by the one or more processors, cause the computer system to generate the one-time-use private key from the seed value using a key derivation function.

19. The non-transitory computer-readable storage medium of claim 13, wherein the executable instructions further comprise instructions that, as a result of being executed by the one or more processors, cause the computer system to provide the hash of the public key to a device.

20. The non-transitory computer-readable storage medium of claim 13, wherein the executable instructions that cause the computer system to provide the public key further include instructions that cause the computer system to:

generate the hash of the public key.

\* \* \* \* \*